United States Patent [19]
Asai et al.

[11] Patent Number: 4,976,488
[45] Date of Patent: Dec. 11, 1990

[54] MOTOR-VEHICLE WITH SLIDING DOORS

[75] Inventors: Keiichi Asai; Chizuko Mochizuki, both of Hamamatsu; Kazunobu Hori, Kosai, all of Japan

[73] Assignee: Suzuki Motor Company Limited, Shizuoka, Japan

[21] Appl. No.: 398,828

[22] Filed: Aug. 23, 1989

[30] Foreign Application Priority Data

Aug. 29, 1988 [JP] Japan .............................. 63-214685
Aug. 29, 1988 [JP] Japan .............................. 63-214689
Sep. 6, 1988 [JP] Japan .............................. 63-222649

[51] Int. Cl.$^5$ .............................................. B00J 5/06
[52] U.S. Cl. ...................................... 296/155; 49/213
[58] Field of Search ................. 296/155, 146, 209; 49/213, 214

[56] References Cited

U.S. PATENT DOCUMENTS

| | | | |
|---|---|---|---|
| 3,594,036 | 7/1971 | Cadiou | 296/155 |
| 4,506,911 | 3/1985 | Nakamura et al. | 296/155 |
| 4,580,823 | 4/1986 | Yamada et al. | 296/155 |
| 4,582,357 | 4/1986 | Nakamura et al. | 296/155 |

FOREIGN PATENT DOCUMENTS

| | | |
|---|---|---|
| 62506 | 10/1982 | European Pat. Off. |
| 1359899 | 3/1964 | France |
| 33016 | 2/1982 | Japan |
| 14520 | 1/1984 | Japan |
| 2126173 | 3/1984 | United Kingdom |

*Primary Examiner*—Robert R. Song
*Attorney, Agent, or Firm*—McGlew and Tuttle

[57] ABSTRACT

The present invention resides in a motor-vehicle having a sliding door, wherein the sliding door is used as a front door of the motor-vehicle, and the sliding door has its front portion formed with an inclined configuration to match the shape of the front pillar, whereas upper, center and lower guide rollers are provided at the sliding door and upper, center and lower guide rails which serve to support these guide rollers are provided along the side panel, and wherein the upper guide rail is provided behind the lower guide rail and the upper guide rail is extended upto an area which is situated more backwardly than the passenger access opening.

4 Claims, 6 Drawing Sheets

MOTOR-VEHICLE WITH SLIDING DOORS

FIELD OF THE INVENTION AND RELATED ARTS

The present invention relates to a motor-vehicle with sliding doors.

In a traditional one-box car having rectangular sliding doors 100 such as for example one shown in FIG. 10, upper, center and lower guide rails 104, 105 and 106 are provided on a roof panel 101, a rear quarter panel 102, a side sill 103 and the like respectively which constitute a side body of a vehicle. Roller assemblies 107, 108 and 109 which are provided on upper, middle and lower stage portions of the inner panel of the sliding door 100 respectively are inserted into these guide rails 104, 105 and 106 to guide the sliding door 100.

In such a prior art arrangement, above guide rails 104, 105 and 106 are formed with top ends curved inwardly so as to close the sliding door 100 as shown in FIG. 11 in a schematic plan view of the door rail. Since roller assemblies 107 and 109 are attached to upper and lower stage portions of the sliding door 100 on the same perpendicular line, the curved angle $\theta_1$ of the upper rail 104 is designed to be equal with the curved angle $\theta_3$ of the lower rail 106 independently of the curved angle $\theta_2$ of the center rail 105.

FIG. 12 is a view illustrating a portion of an upper guide rail 104, wherein there is additionally shown a roof panel 101, a roof rail 110, an upper guide rail 104 provided on the roof rail 110 and a guide roller 111 of the roller assembly 107 which engages the guide rail 104. The guide roller 111 is journalled in the top portion of the support arm 112 which is in turn threadably secured in position on the upper end portion of the sliding door 100.

When the sliding door 100 is used in a motor-vehicle, as shown in FIG. 10. Because the door panel is shorter in length at its upper side than at its lower side, the guide rail that serves to guide the upper roller is short in length. This limits the opening amount of the door panel to the length of the guide rail and acts as an obstruction with regard to a passenger getting on and off the vehicle.

In the rectangular sliding door described above, the upper and lower stage roller assemblies 107 and 109 can be mounted on the same perpendicular line. Accordingly the sliding door 100 can be made to open and close itself in a plane-like movement without any torsion, collapse and the like by designing such upper and lower rails to have the same curved angles $\theta_1$ and $\theta_2$. However, where a front door for a passenger vehicle is of a sliding type; it may not be possible for upper and lower roller assemblies to be attached on the same perpendicular line. As a result, when the front end of the upper rail is formed to have the same curved angle as that for the lower rail, the door will go through an extremely complicated three-dimensional movement in opening and closing which may result in torision or a collapse and the like. That movement may adversely affect the engagement condition of a shut-stop and a sliding contact between a sealing rubber element and a sealing surface of the door inner panel. This will impair the opening and closing movement of the door.

OBJECT AND SUMMARY OF THE INVENTION

It is therefore an object of the present invention to provide a motor-vehicle with a sliding type door, wherein the upper roller is positioned at a location rearwardly of the lower roller and the sliding door may be opened up to its maximum amount of the passenger access opening, by solving the above identified problems in the prior art.

It is an another object of the present invention to provide a motor-vehicle with a sliding door, wherein said door is provided with an upper side and which shorter in length than a lower side is adapted to be opened up to a maximum amount of the passenger access opening and the upper guide rail may be concealled from the outside of the vehicle.

It is a further object of the present invention to provide a motor-vehicle with a sliding door, wherein said door may be allowed to move in a plane-like fashion (simplified movement) at or around the closure of the door, when a door other than a rectangular shape, and instead has the shape of a front door, with associated window shape, of a passenger type vehicle.

To solve the above problems, it is a feature of the present invention that the sliding type door is used as a front door of the motor-vehicle, and the front door has its upper front portion formed in an inclined configuration so as to match the shape of the front pillar of the vehicle.

It is a further feature object of the present invention to provide upper, center and lower guide rollers such that these three rollers are supported in place by mean of upper, center and lower guide rails mounted on the side panel of the body.

It is a still another object of the present invention to provide the upper guide roller more rearwardly than the lower guide roller, and the upper guide rail is extended upto an area behind the passenger access opening.

It is a still further object of the present invention to form each guide rail with its top end curved inwardly toward the interior of the motor-vehicle, such that the sliding door may be in the same plane as the side panel when the sliding door is closed, and curved angles of the other two guide rails are determined such that each of the guide rollers may maintain its relative positional relationship with each other as viewed from a upper direction, when the door is moved along the curved portion of the guide rail which is used as a reference.

It is a still further object of the present invention to provide that the upper guide roller at the upper front portion of the sliding door, and the upper guide rail that serves to guide the upper guide roller is extended from the upper edge of the passenger access opening toward the backward portion of the vehicle body, while a vehicle body panel to which the upper guide rail is attached away from the upper edge of the passenger access opening is formed to match the plane position of the passenger access opening. Additionally, a cover with the same configuration as the outer panel is provided at an exterior portion of the upper guide rail which is provided at a position away from the upper edge of the passenger access opening. A passage is provided for moving the support arm of the guide rollers along the lower edge of the cover.

BRIEF DESCRIPTION OF THE DRAWINGS

FIGS. 1 through 9 illustrate one embodiment of the motor-vehicle with a sliding door according to the present invention, wherein;

FIG. 1 is a schematic view of the sliding door showing it removed from the motor-vehicle;

FIG. 2 is a perspective view of the sliding door showing it closed;

FIG. 3 is a schematic view of the sliding door showing it being opened;

FIG. 4 is a cross-sectional perspective view taken along the line A—A of FIG. 2;

FIG. 5 is a cross-sectional perspective view taken along the line A—A of FIG. 3;

FIG. 6 is a cross-sectional view taken along the line B—B of FIG. 3;

FIG. 7 is a partially cut-away view of the motor-vehicle shown in FIG. 1;

FIG. 8 is a schematic view of the guide rail is viewed from above;

FIG. 9 is a schematic view of the curved top end of the guide rails showing their mutual positional relationship;

DETAILED DESCRIPTION OF PREFERRED EMBODIMENTS

Figure 1:
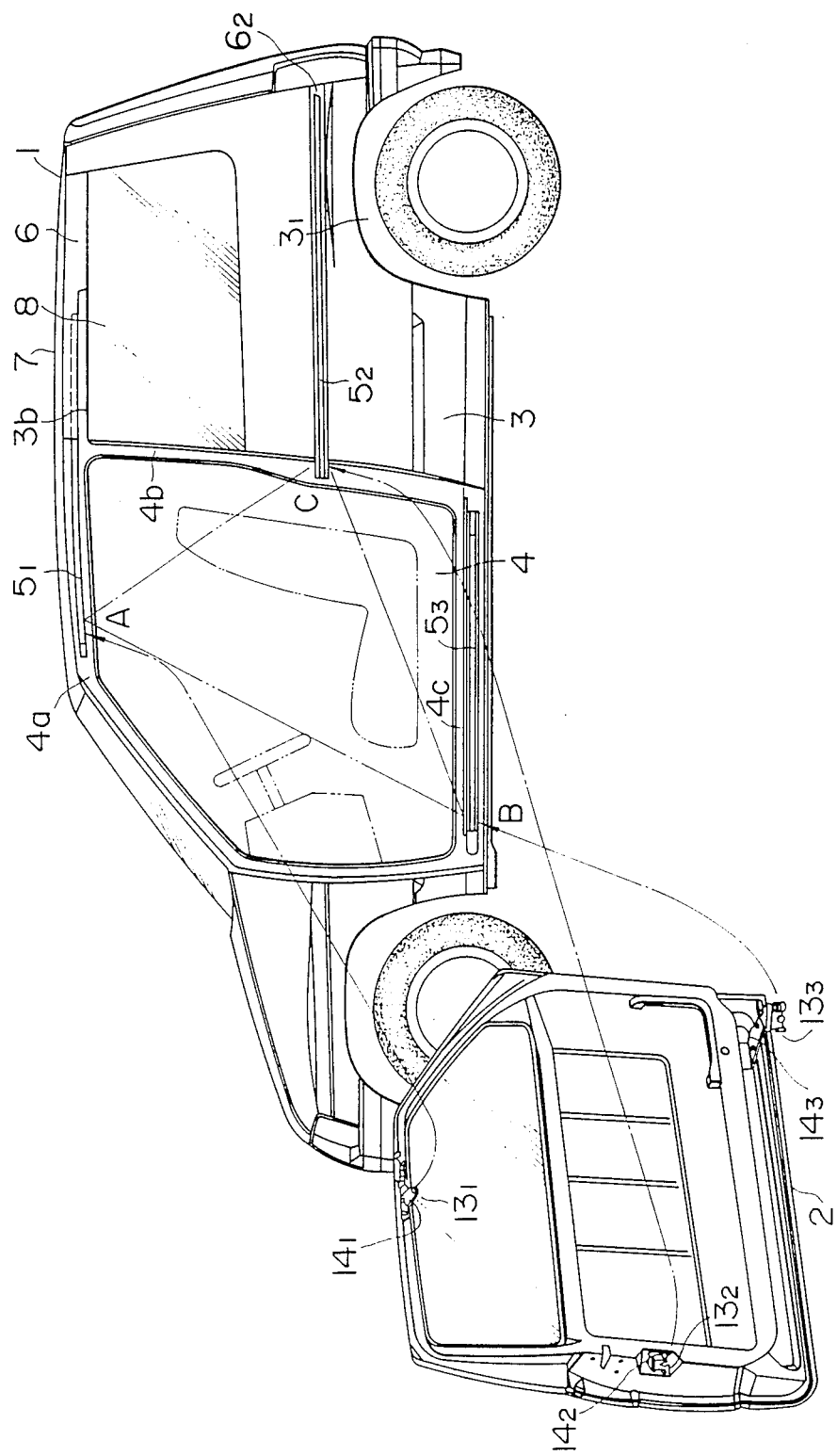
Figure 2:
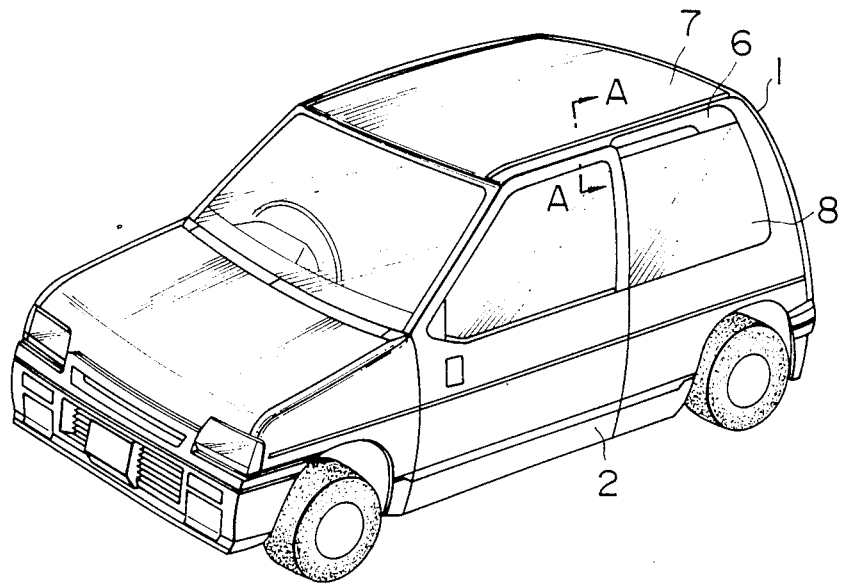
Figure 3:
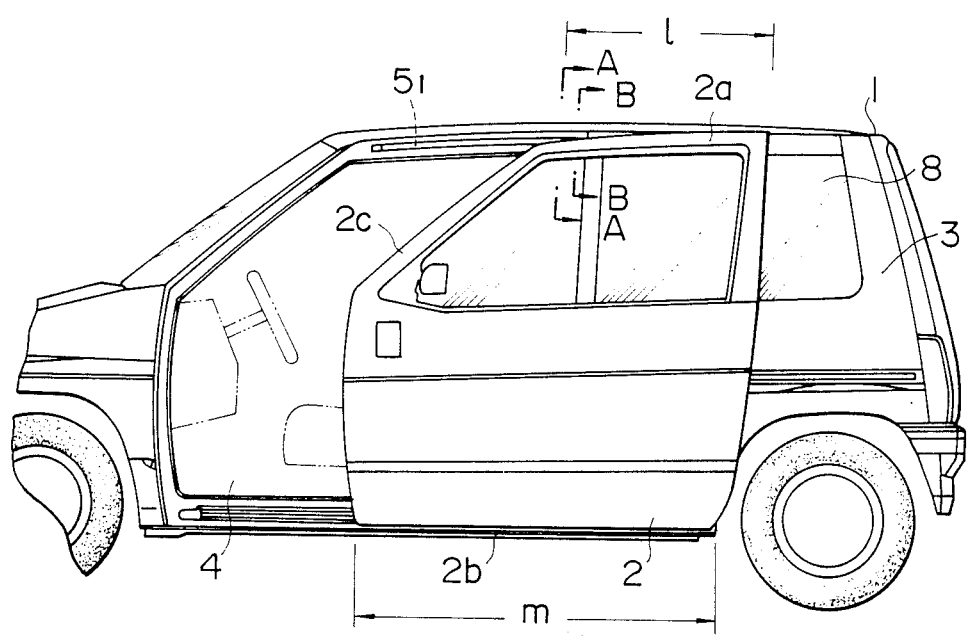
Figure 4:
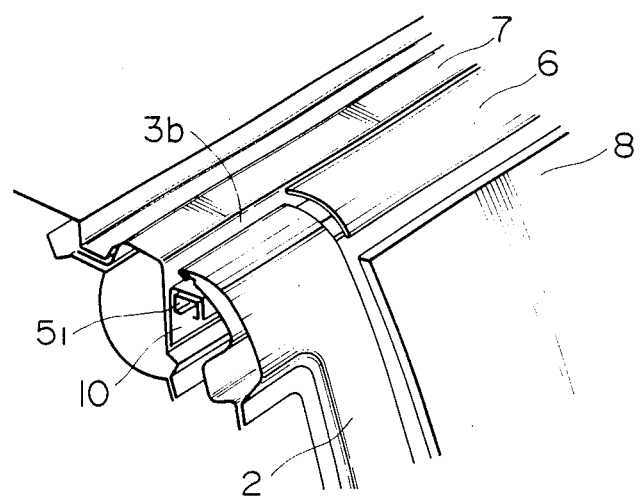
Figure 5:
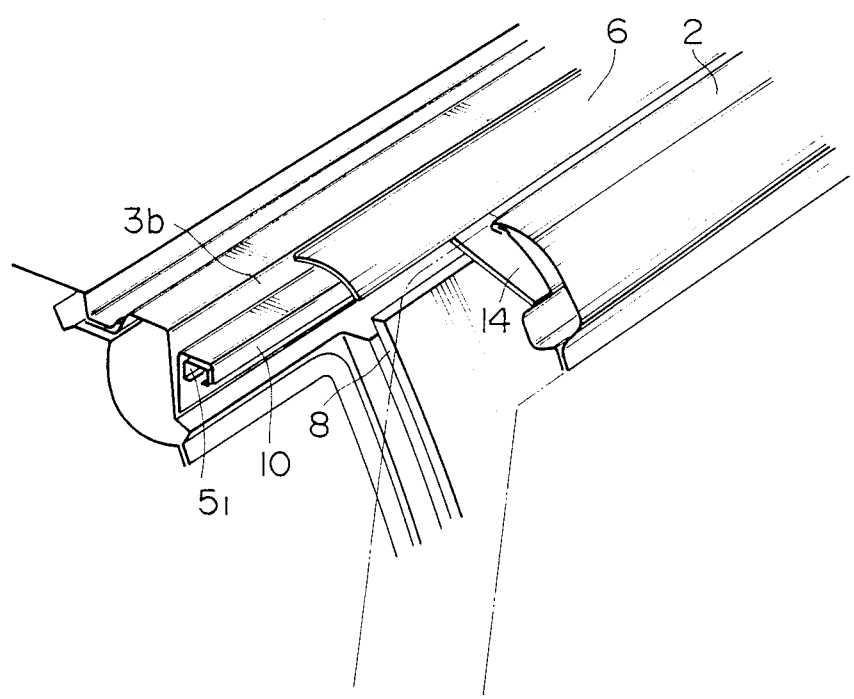

One embodiment of the present invention will be described in detail hereinbelow, with reference to several accompaning drawings.

FIGS. 1 through 6 illustrate a vehicle body of a passenger car type motor-vehicle 1 having a sliding door 2 as a front door. The body has an opening 4 in a side panel 3, the opening 4 being adapted to receive the sliding door 2 as a passenger access opening. The opening 4 has a front pillar diagonally formed to provide a pentagon configuration. The sliding door 2 has the same configuration as that of an a door of ordinary motor-vehicle, i.e., a pentagon configuration, wherein the length 1 of its upper side $2a$ is made shorter than the length m of its lower side $2b$ with an inclined portion $2c$ being formed to extend from the upper side $2a$ to its front end.

Secured to the upper and lower edges $4a$ and $4c$ of the opening 4 are upper and lower guide rails $5_1$ and $5_3$, while a middle guide rail $5_2$ is provided on a side panel, positioned rearwardly of a backward side edge $4b$. The middle guide rail $5_2$ is oriented in the same direction as the upper and the lower guide rails $5_1$ and $5_3$. The sliding door 2 is mounted in position at three points A, B and C on these upper, middle and lower guide rails $5_1$, $5_2$ and $5_3$ through the upper, middle and lower guide rollers (to be described later).

The side panel 3 is formed from the upper edge $4a$ of the opening 4 such that a rearward panel portion $3b$ may be in the same plane as the upper edge $4a$. An upper guide rail $5_1$ is entended up to this panel portion $3b$. This arrangement permits the upper guide rail $5_1$ to have the same length as the lower guide rail $5_3$.

There is a quater-trim element 6 provided midway between the center pillar of a roof panel 1 and a rear pillar. The quater-trim element 6 is formed with a configuration that may permit it to be contigious with the roof panel 7 and cover the rear end of the upper guide rail $5_1$. At the edge of the lower site of the quarter trim element a cut-off portion is formed with a predetermined width over a predetermined length between the quarter trim element and a quarter glass 8. A mounting flange $6a$ and an engaging pawl $6b$ are provided on a backside thereof.

Figure 6:
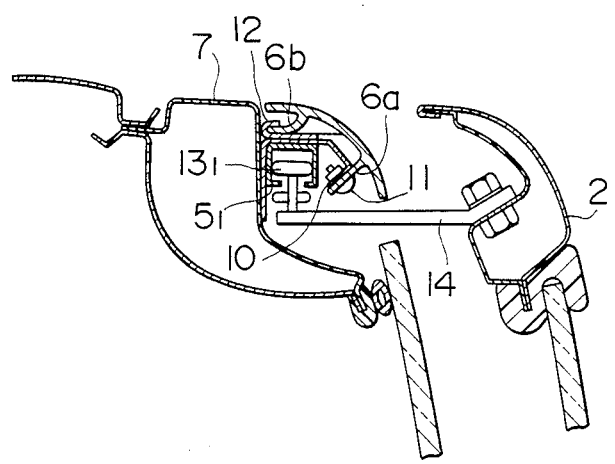

The mounting of the quater-trim element 6 is accomplished by securing the mounting flange $6a$ by means of a screw 11 to a mounting panel 10 which has been attached to the panel portion $3b$ as shown in FIG. 6. Then, the engaging pawl $6b$ is brought into engagement with an engaging portion 12 formed in the upper surface of the mounting panel 10.

The middle guide rail $5_2$ is provided in a center rail receiving groove $3_1$ which is defined in the side panel 3 along its entire length. The trim element $6_2$ (the center-trim element) is provided in the rear end portion of the center rail receiving groove $3_1$ in such a manner that the trim element $6_2$ may cover an area of the center rail receiving groove $3_1$ where the rail $5_2$ is not present.

On the other hand, the sliding door 2 is provided with guide rollers $13_1$, $13_2$ and $13_3$ which engage the upper, center and lower guide rails $5_1$, $5_2$ and $5_3$ respectively. The upper guide roller $13_1$ is supported by an upper support arm 14 which is secured in place on the top end of the upper side of the sliding door 2 rearwardly of the lower guide roller $13_3$.

The lower guide roller $13_3$ is supported by a lower portion support arm $14_3$ which is secured in place on the top end on the lower side of the sliding door 2. The middle guide roller $13_2$ is supported by a center portion support arm $14_2$ which is secured in place on the center portion of the rear side edge of the sliding door 2.

Figure 7:
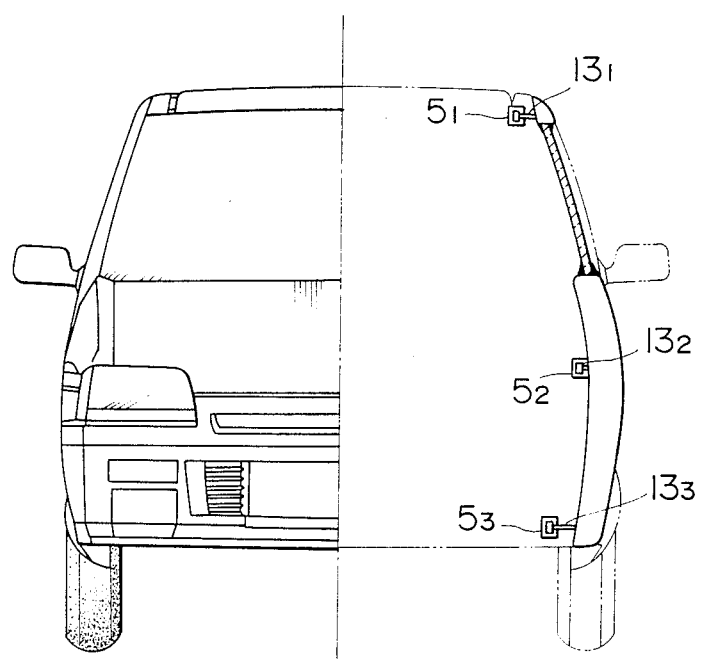
Figure 8:
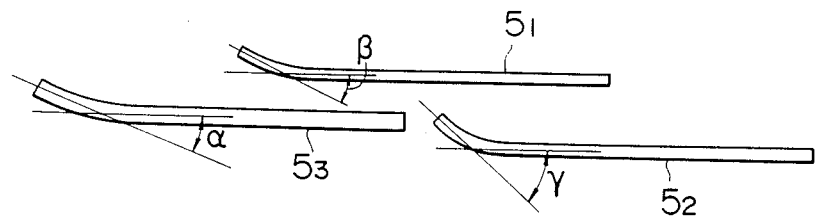

The top ends of above guide rails $5_1$, $5_2$ and $5_3$ are curved inwardly so as to close the sliding door 2 as shown in FIGS. 7-8 having their curved angles related to one another.

Figure 9:
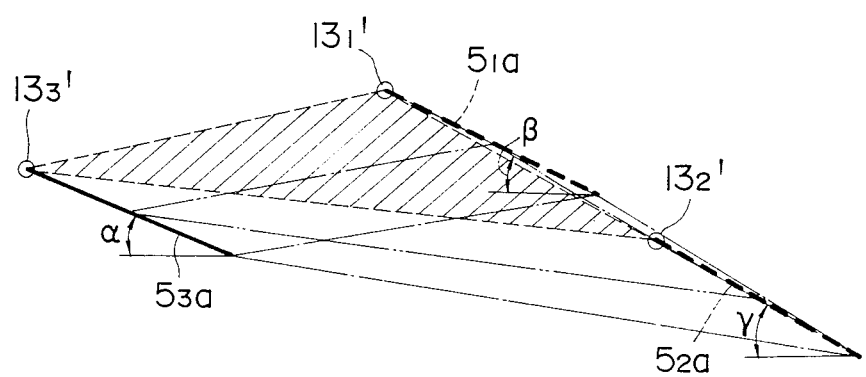
Figure 10:
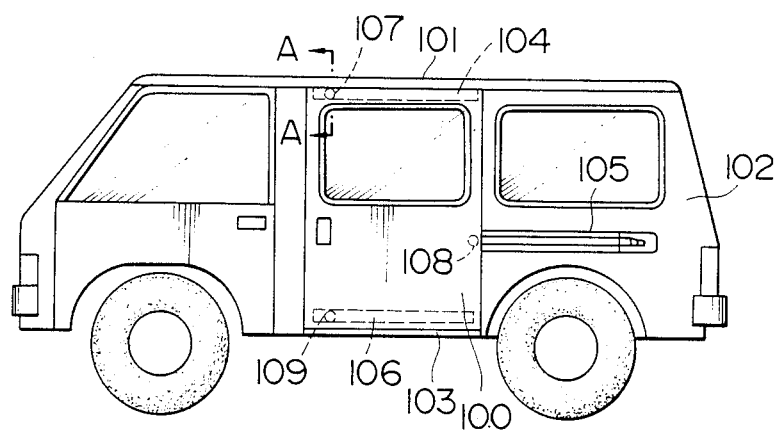
FIG. 10 is side plan view of the motor-vehicle having a traditional structure of the guide rail of the prior art.
Figure 11:
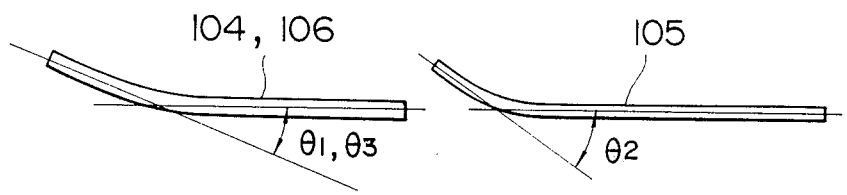
FIG. 11 is a schematic view of the guide rails showing their mutual positional relationship when they are viewed from above, according to the prior art.
Figure 12:
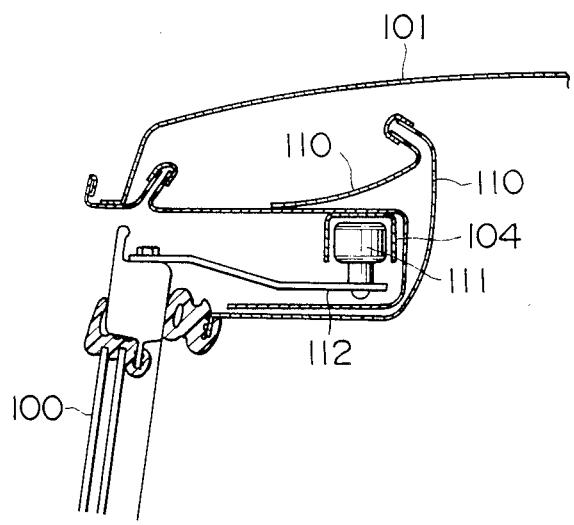
FIG. 12 is a cross-sectional view taken along the line A—A of FIG. 10.

Referring to FIG. 9 the angular relationship of the guide rollers $13_1$, $13_2$ and $13_3$, which are provided on upper, center and lower stages respectively, is plotted showing the door closure positions as viewed from above. The roller path is shown when they are moved along the curved angle of the curved top end of the lower rail $5_3$ so as to maintain in a plane a triangular shape which is to be formed by a line connecting three positions $13'_1$, $13'_2$ and $13'_3$. A line along a locus of other apexes of the triangle is used to form the shape of the curved top ends of the upper rail $5_1$ and the center rail $5_2$ and their curved angles $\beta$ and $\gamma$.

Where the curved angle $\gamma$ of the center rail $5_2$ is formed to be larger than the curved angle $\alpha$ of the lower rail $5_3$, the curved angle $\beta$ of the upper rail will be an angle in a range between the angles $\alpha$ and $\gamma$ as shown in FIG. 9.

In an above arrangement, the sliding door 2 is caused to open by permitting guide rollers $13_1$, $13_2$ and $13_3$ to roll along upper, center and lower guide rails $5_1$, $5_2$ and $5_3$ when the opening of the sliding door 2 is attempted. At this moment, the upper guide roller $13_1$ is caused to roll along the upper guide rails $5_1$ to enter into a clearance between the quater-trim element 6 and the quarter-glass 8. In this manner, the sliding door 2 may be opened to a maximum amount of the passenger access opening 4.

A relationship between each of guide rails $5_1$, $5_2$ and $5_3$ and guide rollers $13_1$, $13_2$ and $13_3$ which may exist at this moment will be described hereinbelow.

Other guide rails $5_1$ and $5_2$ are designed such that their configuration and angles may be invariably maintained when the curved top ends $5_1a$, $5_2a$ and $5_3a$ of guide rails $5_1$, $5_2$ and $5_3$ which are arranged to lie in parallel with the vehicle body, are caused to move along a guide rail $5_3$. The guide rail $5_3$ provides a reference point for a relative positional relationship when viewed from above. It is possible to provide a guide rail structure of the sliding type door vehicle adapted to be opened and closed without entailing any torsion, collapse and the like. Furthermore, because the sliding door can be moved in a simplified manner, it provides a superior enegaging condition between shut-stops and a good sliding contact between a sealing rubber element and a door inner panel. Thus, a sliding door type vehicle which ensures a good closing performance is provided.

As described hereinbefore, in a motor-vehicle with a sliding door according to the present invention, it is possible to adopt a sliding door with a front glass for a passenger type motor-vehicle of pentagon configuration, since the sliding door is used with such front glass and the front portion of the sliding door is formed with an inclined configuration so as to match the shape of front pillar.

Moreover, the upper guide roller is provided rearwardly of the lower guide roller and the upper guide rail is arranged to extend rearwardly behind the above opening, and therefore the sliding door takes the same shape and form as an ordinary door for a motor-vehicle and the door can be opened to the maximum amount of the passenger access opening.

Moreover, according to the present invention, the upper guide roller is provided on the front part of the upper side of the sliding door, and the upper guide rail that serves to guide the upper rollers is arranged to extend from the upper edge of the passenger access opening to the rearward portion of the vehicle body. While the vehicle body panel is provided at an area of the vehicle body where the above guide rail is kept away from the upper edge of the access opening and it corresponds to the plane position of the passenger access opening, a cover having the same configuration as that of outer panel of the vehicle body is provided at an exterior portion of the upper guide rail. A passage is formed along the lower edge of the cover to move the support arm of guide roller, and therefore the sliding door may appear the same as an ordinary door and may be opened fully to a maximum opening amount of the passenger access opening.

Moreover, where a door of a shape other than rectangular is used as a sliding door including a front glass window shape for a passenger type vehicle, the present invention can provide a sliding door which can be opened and closed without entailing any torsion and collapse etc., in a very simplified manner. Furthermore, the movement of the door itself is simplified to improve an engaging condition between shut- stops and a sliding contact between a sealing rubber element and a door inner panel. Thus, a sliding door with a very good closing function is provided.

What is claimed is:

1. A motor vehicle including a motor vehicle body defining a front door opening including a front pillar extending slanting forwardly and downwardly; a sliding door positionable in said front door opening, said sliding door having an upper edge and a lower edge, said upper edge being shorter than said lower edge, said front door including an inclined surface extending from a front end of said upper edge downwardly and forwardly in a slantwise direction, said sliding door including an upper guide roller, a central guide roller and a lower guide roller, said rollers being engaged with and supported by an upper, a central and a lower guide rail respectively, said guide rails being supported on said vehicle body.

2. A motor vehicle according to claim 1, wherein said upper guide roller is positioned connected to said door at an upper guide roller location and said lower guide roller is positioned connected to said door at a lower guide roller location, said upper guide roller location being positioned rearwardly of said lower guide roller location, said upper guide rail being positioned extending from said door opening into an area behind said door opening.

3. A motor vehicle according to claim 2, wherein each of said guide rails has a top end forming a curved configuration, said curved configuration extending toward the interior of a passenger cabin of said vehicle, said sliding door being connected to said guide rails through said guide rollers such that said sliding door may be positioned in the same plane as a side panel of said vehicle, said configuration of two of said guide rails being formed such that the position of each guide roller remains in a plane substantially perpendicular to horizontal as the door is moved along the curved portion of the guide rails.

4. A motor vehicle according to claim 2, wherein said upper guide roller is provided at an upper front portion of said sliding door, said upper guide rail extending from an upper edge of said front door opening to a rearward portion of the vehicle body, a vehicle body panel adjacent the upper edge of the front door opening is formed to correspond with a plane position of the front door opening, a cover having a configuration substantially the same as an outer panel of the vehicle body is provided at an exterior of said upper guide rail at a location spaced from an upper edge of the front door opening, and a passage for guiding the support arm of the upper guide roller along said lower edge of the cover.

* * * * *